(12) United States Patent
Miyachi et al.

(10) Patent No.: US 7,511,837 B1
(45) Date of Patent: Mar. 31, 2009

(54) PARTIAL PRINT PROVIDER

(75) Inventors: Christine Miyachi, Andover, MA (US);
Hang Zhang, Arlington, MA (US);
Daniel Romano, Groton, MA (US)

(73) Assignee: Xerox Corporation, Norwalk, CT (US)

( * ) Notice: Subject to any disclaimer, the term of this patent is extended or adjusted under 35 U.S.C. 154(b) by 1884 days.

(21) Appl. No.: 09/726,233

(22) Filed: Nov. 29, 2000

(51) Int. Cl.
*G06F 3/12* (2006.01)

(52) U.S. Cl. .................. 358/1.15; 358/402; 358/403; 709/205; 709/223

(58) Field of Classification Search ............... 358/1.15, 358/1.13, 3.1; 709/205, 217, 203, 223, 211
See application file for complete search history.

(56) References Cited

U.S. PATENT DOCUMENTS

| | | | | |
|---|---|---|---|---|
| 5,220,674 A | * | 6/1993 | Morgan et al. | 709/223 |
| 5,559,933 A | * | 9/1996 | Boswell | 358/1.15 |
| 5,602,974 A | * | 2/1997 | Shaw et al. | 358/1.15 |
| 5,845,056 A | * | 12/1998 | Kohler et al. | 358/1.9 |
| 5,845,058 A | * | 12/1998 | Shaw et al. | 358/1.15 |
| 5,885,723 A | * | 3/1999 | Takahashi et al. | 428/626 |
| 5,995,723 A | * | 11/1999 | Sperry et al. | 358/1.15 |
| 6,240,456 B1 | * | 5/2001 | Teng et al. | 709/230 |
| 6,392,758 B2 | * | 5/2002 | Hines | 358/1.9 |
| 6,474,881 B1 | * | 11/2002 | Wanda | 400/61 |
| 6,535,865 B1 | * | 3/2003 | Skaaning et al. | 706/52 |
| 6,614,546 B1 | * | 9/2003 | Kurozasa | 358/1.15 |
| 6,814,510 B1 | * | 11/2004 | Sabbagh et al. | 400/63 |
| 6,822,754 B1 | * | 11/2004 | Shiohara | 358/1.15 |
| 7,096,280 B2 | * | 8/2006 | Aoki et al. | 709/246 |
| 2008/0137121 A1 | * | 6/2008 | Chrisop et al. | 358/1.13 |

* cited by examiner

*Primary Examiner*—Negussie Worku
(74) *Attorney, Agent, or Firm*—Fay Sharpe LLP

(57) ABSTRACT

A partial print provider in the form of a Dynamically Linked Library (DLL) that implements a portion of a commercial spooler Application Programming Interface (API). The print provider translates between printer and job properties under the commercial spooler to and from printer and job properties under a proprietary spooler. This permits a third party proprietary print spooler to interface with the commercial print spooler, allowing greater control and management of print jobs by network clients than is available under the commercial spooler. The partial print provider allows the proprietary spooler to leverage off of the commercial print system's print services, protocols and network technologies, obviating the need to replace all commercial spooler and print services with custom code and reducing costs substantially.

7 Claims, 3 Drawing Sheets

PARTIAL PRINT PROVIDER

BACKGROUND OF THE INVENTION

1. Field of the Invention

The present invention pertains generally to a network printing subsystem and particularly to a partial print provider for use in association with a commercial print spooler. More particularly, the present invention relates to a Dynamically Linked Library (DLL) that translates between printer and job properties under a commercial spooler to and from printer and job properties under a proprietary spooler.

2. Discussion of the Art

In a network printing system, individual client workstations may communicate with and issue print jobs to a network print server. The server in turn then processes these jobs and transmits them to a physical printer, known as a print device. Although the exact processes that occur in a network print system vary depending on the manufacturer of the print server software, certain processes are common to most of the available printing systems. A description of the printing process on a network, as exemplified in a Microsoft Windows NT environment, follows below.

Initially, an administrator creates a printer on a server and shares it with client workstations connected on the network. This is done by setting configuration options such as the printer's name, its driver and a port it prints to and is most easily accomplished using the Print Manager feature of Windows NT. A network client workstation then creates a print job and submits it. When using remote printing over a network, a router in the client's local workstation directs the print job to a Remote Print Provider in the workstation. This Remote Print Provider communicates with a router in the network print server and passes the print job to the network server.

The Windows NT print server may use one of several print server services to receive the print job depending on the operating system used by the client that is submitting the print job. The service will then submit the job to a server's spooler. The service does this by making WIN32 calls to the spooler API ("Application Programming Interface"). The spooler is the generic term for software components that schedule, distribute and control print jobs. The NT spooler acts like a single service but has several components. These components include a print spooler router and a local print provider. The print spooler router will manage the routing of the print job as it is passed to and returned from the local server spooler components. After receiving the print job from the server service, the print job will be assigned a data type and sent to the spooler router.

When sent to the spooler, the router will initially send the job to a local print provider. The local print provider is responsible for spooling the print job to disk and passing control to a print processor for modification if necessary. The print processor performs the appropriate modifications and then returns the job to the print provider. Both the print provider and the print processor are part of the NT spooler. The job is then sent to a port monitor.

The port monitor then communicates with a local port's driver to deliver the job to a print device. The print device produces a hard copy output by interpreting the print job by means of built in interpreter software.

Traditionally, network printing from applications has been a one-directional exchange of information. The application program generates a printer dependant stream of data and then passes this stream to the print server and on to the print device. Print status back to a client submitting a print job is no longer available once the port monitor has accepted the print job. In addition, a client had no control in stopping, continuing or modifying a submitted print job.

In an effort to increase user control of print jobs, some entities choose to use their own proprietary spooler to manage print jobs on their network. However, because it is difficult to interface the two, the NT spooler and the proprietary spooler cannot normally be used together. Consequently, if you wanted your print server application to work with the NT Operating System, you would have to replace your application's print spooler with the NT print spooler and completely rely on its capabilities to spool, queue, and manage print jobs. An even more costly alternative is to replace all NT spooler and print services with custom code.

Thus, it has been recognized that it would be advantageous to have a component that would provide a gateway between a commercial spooler (such as the NT print spooler) and a proprietary spooler that would allow processing of a print job by the proprietary spooler while leveraging off of the commercial spooler's existing print services and network technologies Attempts have been made in this field using a language and port monitor approach, in which proprietary code is simply appended to the end of the Windows NT print processing chain. This is a well-documented approach and is useful in that standard print processors will work without modification. However, this approach is problematic in that error processing is difficult and, in the case where applications require double spooling, it is difficult to keep two printer spool files synchronized.

Thus, a need exists for a way to interface a third party's proprietary spooler with a commercial print spooler in which there is no need for port and language monitors.

BRIEF SUMMARY OF THE INVENTION

A primary object of the present invention is to provide a means for a network print job to bypass the standard spooler in a commercial print server and instead send the print job to a proprietary spooler, allowing a network client to communicate with a network print device and control the job though that proprietary spooler.

Another object of the invention is to provide a means by which the proprietary spooler can be interfaced with the commercial print server spooler, allowing processing of the print job while maintaining as much of the original commercial printing architecture as possible, thus minimizing the need for custom code in the print architecture.

Still another object of the invention is to provide this interface regardless of the type of operating system or platform that a network client workstation is using.

Yet another object of the invention is to provide this interface without the need for double spooling of submitted print jobs.

To achieve the foregoing as well as other objects, a partial print provider is described in which print jobs submitted to a print server bypass a commercial spooler and instead are routed to a proprietary spooler. In an exemplary embodiment in a Microsoft NT print system, the partial print provider is a Dynamically Linked Library (DLL) that implements a portion of the Microsoft spooler API. When the server services make WIN32 calls to the spooler API, the spooler forwards the calls to the partial print provider. The partial print provider routes all print jobs sent to the NT network server to a proprietary spooler for processing and print job management. The local server spooler has been configured to take only data labeled as RAW. All Postscript, PCL and text jobs from all clients are labeled RAW. Thus, the NT spooler does not process the job and passes it on through the partial print provider to the proprietary spooler for processing.

BRIEF DESCRIPTION OF THE DRAWINGS

The following is a brief description of the drawings which are present for the purposes of illustrating the invention and not for purposes of limiting the same.

DETAILED DESCRIPTION OF THE INVENTION

Figure 1:
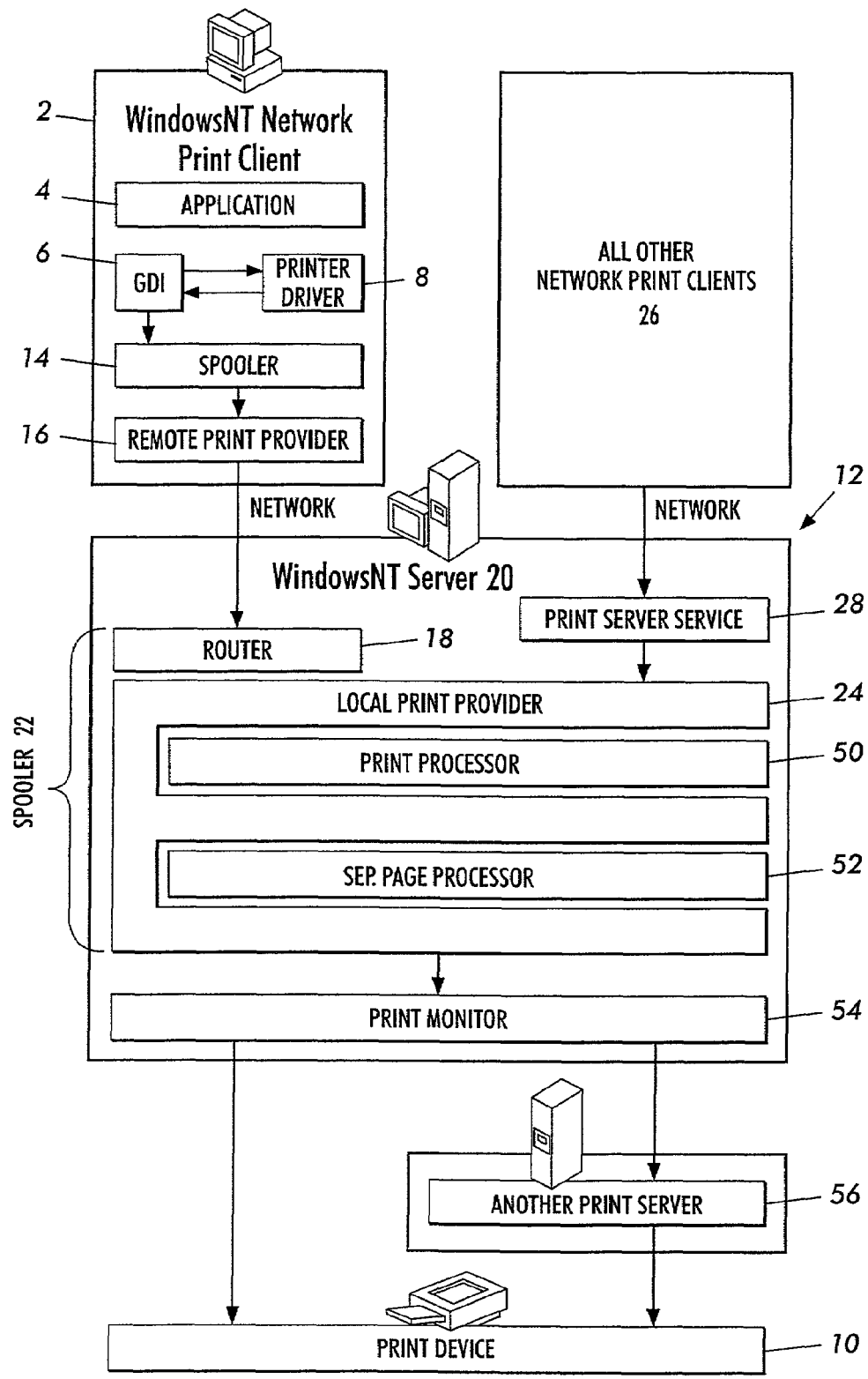
FIG. 1 is a depiction of a typical network printing architecture in a Microsoft NT system.

Referring to FIG. 1, in a typical Windows NT network, a print client workstation 2 creates a print job using an application program 4. The specifics of the print job are defined by a Graphics Device Interface (GDI) 6 associated with the application program. The GDI print job output contains both content and formatting information for the print job. A print driver 8 on the client workstation communicates with the GDI to define the print job and the print services requested of a particular printer. When printing to a remote print device 10 over a network 12, the print job is not processed by a local spooler 14 on the client workstation. Instead, the job is directed through the spooler via its router component (not shown) to a remote print provider 16 located on the client workstation. This routing is programmed when a remote printer is added to the network.

The remote print provider 16 sends the print job over network 12 to a print spooler router 18 in a network NT print server 20. In the print server machine the print spooler router 18 is part of the print server's spooler process 22. Router 18 passes the print job to the local NT print provider 24. The Windows NT print spooler is not a single software component. Rather, as is well known in the art, it is a group of components that manage the print process by scheduling, distributing, and controlling print jobs. These components are implemented as 32-bit DLL's.

In the case of print jobs received from network client workstations 26 other than NT clients, a print server service 28, on the network 12, will receive these print jobs initially. There are various print server services available. These services are application programs run by the NT operating system which provide the necessary interface between a server's spooler and the various operating systems submitting print jobs. The services translate the client print requests into an NT compatible request by converting them to use the standard WIN32 API's. As can more easily be seen in FIG. 3, the Windows NT server has four services available to it. The Windows NT server can receive print jobs from clients running software from Novell 34 if the File and Print Services for NetWare 36 is installed. Line Printer Remote ("LPR") clients on Unix computers 38 use the TCP/IP Printing Service 40, which is often referred to as LPD. AppleTalk clients on Macintosh computers 42 use Services for Macintosh 44. All print jobs, except those generated on an NT client workstation 2 are processed through a service. Clients running on an NT system 2 may use a service if a local port is redirected over the network. In such a case, the client would use the Windows NT Server Service 46. Regardless of which service is used, the print job will then be passed to the print server's spooler 22. The service does this by making WIN32 calls 48 to the NT spooler API. The spooler will then assign a data type to the print job. This assignment tells the other spooler components whether and how to alter the print job. There are several data types supported by the NT printing subsystem and the data type that is assigned to the job is determined by the type of client that sent the job, whether the client requested a particular type of job alteration and (depending on whether the job originated from an AppleTalk client) whether the print device is a postscript or non-postscript print device. The most common data type is RAW or unprocessed data. All jobs originating from Windows network clients will be assigned the default data type value, which is the RAW datatype. Most jobs from other clients will also be labeled as RAW unless the client sends a formatting command along with the print job. A characteristic of a print job assigned the RAW data type is that it is already in a format suitable for the print device without the need for further processing. PCL and PostScript formats are examples of the RAW data type.

Returning to FIG. 1, the spooler 22 then passes the print job to a print processor 50. The print processor is a component of the print provider 24. The print processor is a DLL that interprets and translates data types passed from the spooler. The print processor receives the job and performs appropriate modifications if necessary. It will then return the completed job to the spooler. When data is labeled RAW, the NT print processor does not process it and passes it back to provider for further routing. A separator page processor 52 will add a separator file if the administrator has specified one. The separator page processor is another component of the NT print provider. The job is then delivered to a print monitor 54. The print monitor in turn delivers the job to a print device 10 attached to a locally controlled port or to another print server 56 for further processing. The print device 10 uses built in software to interpret the print job and produce a hard copy output. It is to be understood that the print device 10 may be a xerographic device such that the print system also operates in a xerographic environment.

Although the NT print spooler is sophisticated and adaptable to many needs of its users, it lacks some features that some users find useful or necessary in their work. Thus, it would be advantageous if these users could design a spooler that would be completely suited to their needs yet would also allow continued use of NT print services and protocols. For this to be done, however, a mechanism is required that allows this proprietary print spooler to be integrated into the NT printing architecture. The print provider of the present invention allows this in the following way.

Figure 2:
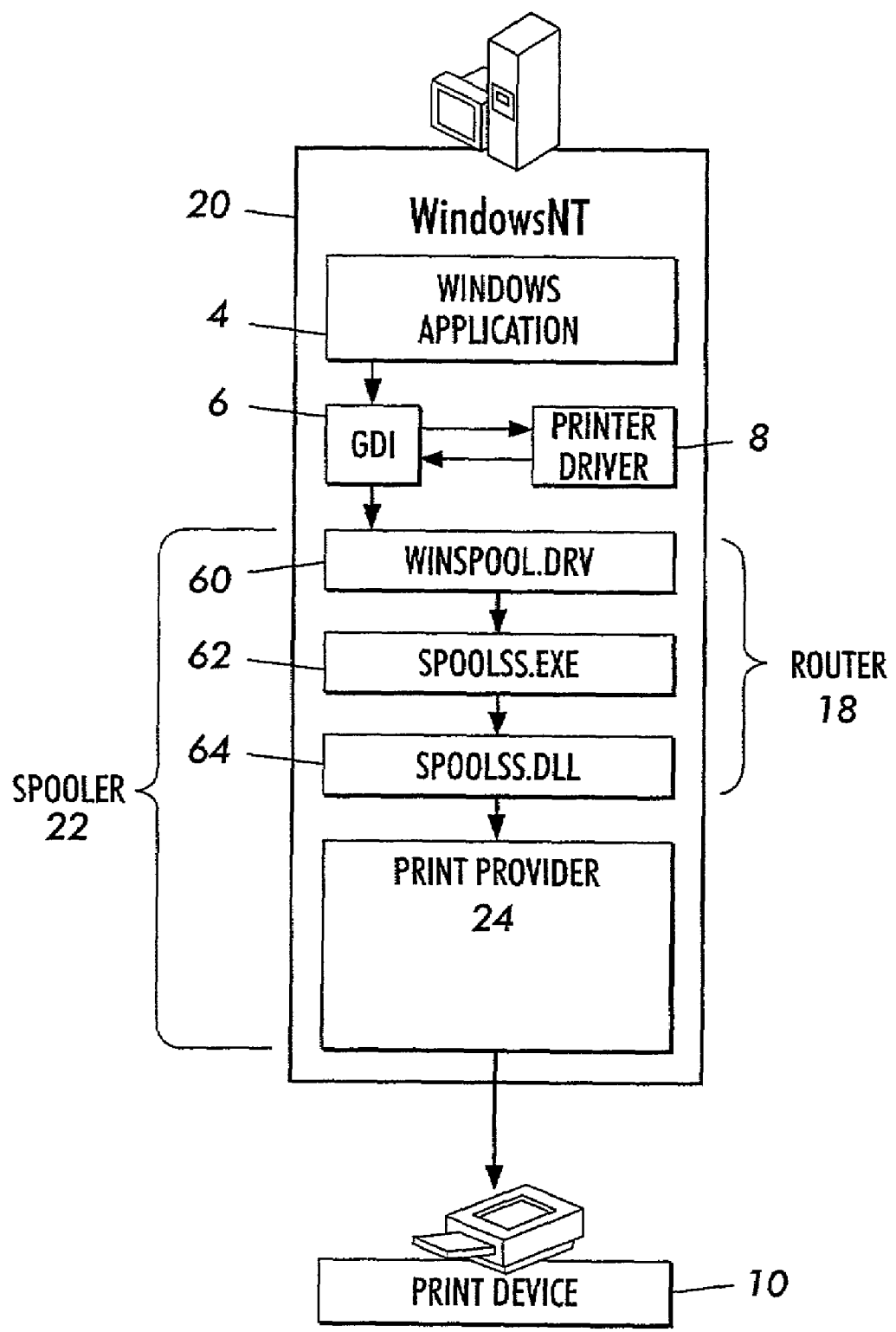
FIG. 2 is a depiction of the NT print architecture showing an expanded view of the router components
Figure 3:
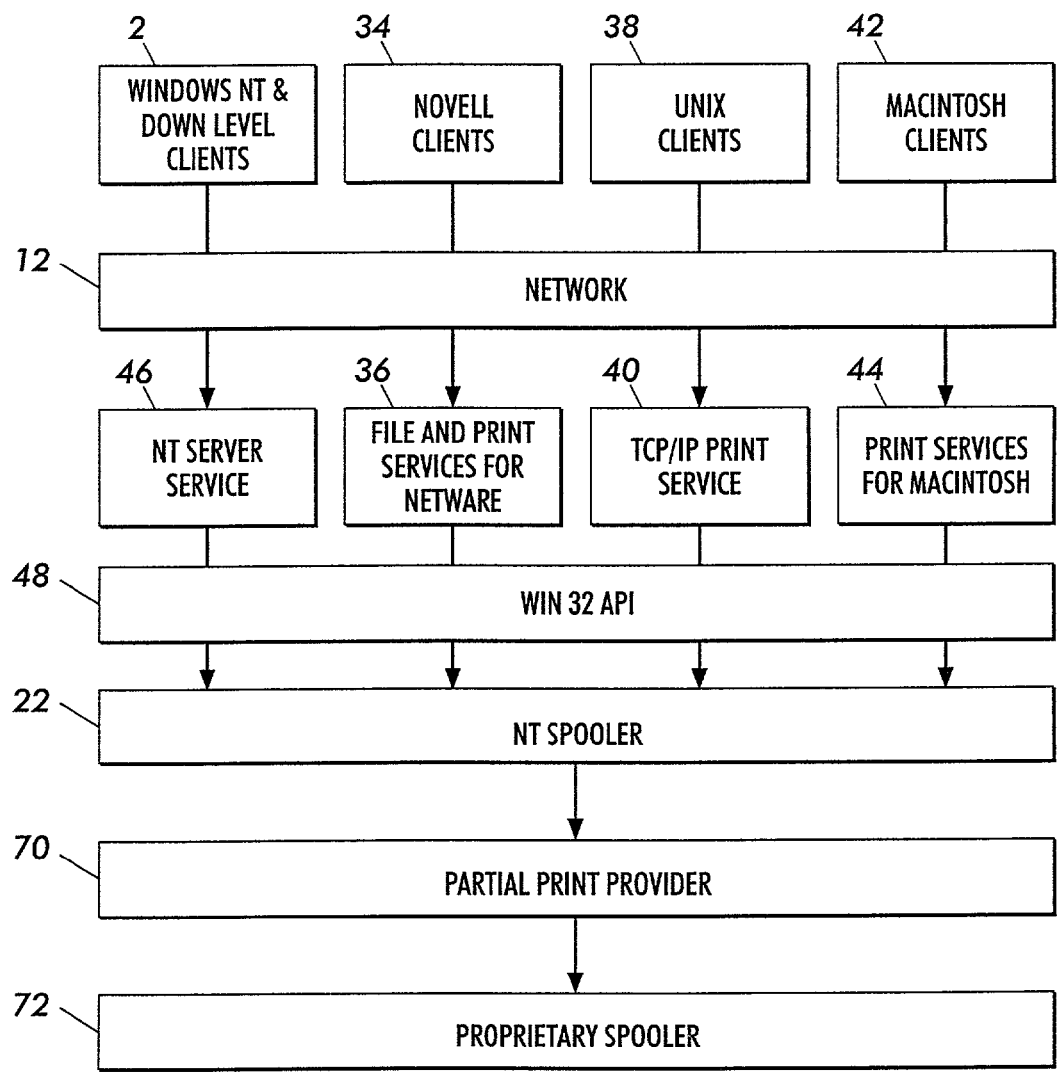
FIG. 3 is a diagram showing how the partial print provider acts as a gateway between the NT print spooler and a proprietary spooler.

The present invention provides a means for a print job to bypass most of the NT print spooler components and instead be forwarded to a proprietary spooler for processing. This is possible because the NT spooler process is extensible and routed, rather than a single executing file. Referring to FIG. 2, the extensible nature of the NT router is depicted. An NT server 20 is shown in which a print job is created in a Windows application 4. This Figure shows a print job that is generated on the print server itself rather than on a remote client workstation. However, the processing of the print job is the same. The GDI 6 associated with the application and the print driver 8 for the designated printer will output a command set defining the print job. The print job is then sent to the server router 18, which is part of the spooler process. The router is comprised of several software files including the Winspool.drv 60, Spoolss.exe 62, and Spoolss.dll 64 files. Instead of passing the print job along to a local print provider 24 and print device 10 as in standard NT print processing (FIGS. 1 and 2), the print spooler router 18, specifically the Spoolss.dll file 64, passes the WIN32 calls for print job management along to the partial print provider 70 (FIG. 3). The partial print provider is a DLL file that serves as a gateway between the NT spooler process and a proprietary spooler 72. It receives incoming print jobs and defines them in a manner that can be understood by the proprietary spooler. In an exemplary embodiment, the partial print provider accepts only data labeled as RAW. Any other print jobs will be canceled. The printing system is configured such that all Postscript, PCL, and text jobs from all clients are labeled as RAW. The partial print provider 70 will in turn call the Request Operator ("RO") API to interface with a proprietary spooler 72 for print job processing. The print job is passed to the proprietary spooler via RO API. The partial print provider interfaces with the proprietary spooler though a RO library. This is a library that provides native NT applications with various facilities. The RO library offers up to one hundred individual communication links called channels, which access the proprietary spooler's resources and operations. In one embodiment, the partial print provider uses one channel for all job submissions and a pool of ten channels for job management and control.

The print provider may be implemented to have the following characteristics. All of these features are easily coded by those who are familiar with the art.

1. It reads only RAW data as defined by Microsoft
2. It does not support DevMode
3. It supports Backehannel (AppleTalk feature only)
4. It receives and handles all asynchronous status from the proprietary print spooler
5. It supports NetBIOS
6. It supports Novell/Netware
7. It supports LPD, RFC.1179
8. It supports AppleTalk
9. It supports port 9100
10. It lists queue status for printers
11. It submits multi-doc LPD job (will be handled as a set of single-doc jobs
12. It is able to check the status of a print jobs
13. It is able to pause/resume a job where supported by native printer protocols
14. It is able to cancel any jobs in the queue
15. It supports Windows 3.11 clients
16. It supports WinNT 3.51/4.0 clients
17. It supports Windows 95 and 98 clients
18. It supports the most current version of Novell/NetWare clients
19. It supports Unix LPR
20. It supports the most current version of OS/2
21. It is advertised on the network and the domain, printer name and username is configurable
22. The EnumPrinters function is implemented only on a server that the printer is on
23. It does not limit the number of jobs spool-able and status-able from the proprietary print spooler
24. It supports status information handling on printers and queues/jobs
25. It supports the Win32 API function Printer API's (Levels 1, 2, 4, 5)
26. It supports the Win32 API function OpenPrinter
27. It supports the Win32 API function ClosePrinter
28. It supports the Win32 API function EnumPrinters (Level 1)
29. It supports Job API's (GetJob, SetJob)
30. It supports the Win32 API function AddJob
31. It supports the Win32 API function ScheduleJob
32. It supports the Win32 API function StartDocPrinter
33. It supports the Win32 API function WritePrinter
34. It supports the Win32 API function ReadPrinter
35. It supports the Win32 API function EndDocPrinter
36. It supports the Win32 API function EnumJobs
37. It supports the Win32 API function Admin and Configuration (Ports Level 1 & 2)
38. It supports the Win32 API function EnumPorts
39. It supports the Win32 API function ConfigurePort
40. It supports the Win32 API function DeletePort
41. It shall support the NetBIOS print manager 'Printer Status' function
42. It supports the Win32 API function FindFirstPrinterChangeNotification
43. It supports the Win32 API function FindClosePrinterChangeNotification
44. It supports the Win32 API function RefreshPrinterChangeNotification
45. It supports the Win32 API function ReplyPrinterChangeNotification
46. It supports the Win32 API function PartialReplyPrinterChangeNotification
47. It supports the Win32 API function RouterAllocPrinterNotifyInfo
48. It supports the Win32 API function RouterFreePrinterNotifyInfo
49. It supports the Win32 API function ppendPrinterNotifyInfo The invention has been described with reference to an illustrative embodiment. Obviously, modifications and alterations will occur to others upon a reading and understanding of the preceding detailed description. It is intended that the invention be construed as including all such alterations and modifications insofar as they come within the scope of the appended claims or the equivalents thereof.

What is claimed is:

1. A partial print provider that permits a first print spooler associated with a network print server to interface with a second print spooler associated with the network print server for further processing of a print job submitted to the network print server from a network print client, wherein the partial print provider acts as a direct link between the first print spooler and the second print spooler.

2. A partial print provider according to claim 1 wherein the network print server is operating Windows NT software and the second print spooler is a Windows NT print spooler.

3. A partial print provider according to claim 2 wherein the interface between the NT print spooler and the first spooler permits the first spooler to leverage off on Microsoft's print services, protocols and network technologies.

4. A partial print provider according to claim 1 wherein the partial print provider is a dynamically linked library file.

5. A partial print provider according to claim 1 wherein all print jobs received by the second spooler are forwarded to the first spooler for further processing.

6. A partial print provider according to claim 1 wherein the partial print provider can be modified to establish an interface between the first print spooler and any second spooler.

7. A partial print provider according to claim 1 wherein the network print server is configured to be used with a xerographic print device.

* * * * *